United States Patent
Rc et al.

(10) Patent No.: US 12,112,216 B2
(45) Date of Patent: Oct. 8, 2024

(54) DECLARATIVE API FOR MANAGING CONNECTORS AND SCHEMAS

(71) Applicant: Confluent, Inc., Mountain View, CA (US)

(72) Inventors: Rajesh Rc, Mountain View, CA (US); Pei Yang, Belmont, CA (US); Andrew Ding, San Francisco, CA (US); Rohit Bakhshi, Mountain View, CA (US); Lokesh Shekar, Mountain View, CA (US); Steven Costa, Mountain View, CA (US)

(73) Assignee: Confluent, Inc., Mountain View, CA (US)

(*) Notice: Subject to any disclaimer, the term of this patent is extended or adjusted under 35 U.S.C. 154(b) by 0 days.

(21) Appl. No.: 18/046,119

(22) Filed: Oct. 12, 2022

(65) Prior Publication Data

US 2024/0126625 A1    Apr. 18, 2024

(51) Int. Cl.
 *G06F 9/54*    (2006.01)
(52) U.S. Cl.
 CPC ............................. *G06F 9/547* (2013.01)
(58) Field of Classification Search
 CPC ...................................................... G06F 9/547
 See application file for complete search history.

(56) References Cited

U.S. PATENT DOCUMENTS

| | | | |
|---|---|---|---|
| 2009/0064142 A1* | 3/2009 | Kajita | G06F 9/4843 718/100 |
| 2011/0126192 A1* | 5/2011 | Frost | G06F 8/61 717/178 |
| 2011/0173302 A1 | 7/2011 | Rider | |
| 2012/0072597 A1 | 3/2012 | Teather et al. | |
| 2014/0317448 A1* | 10/2014 | Rash | G06F 11/1438 714/15 |
| 2016/0323370 A1* | 11/2016 | Lin | H04L 67/12 |
| 2018/0102938 A1 | 4/2018 | Yoon et al. | |
| 2018/0316735 A1* | 11/2018 | Yang | G06F 11/3089 |
| 2019/0312789 A1* | 10/2019 | Asbi | G06F 9/44526 |
| 2019/0342229 A1 | 11/2019 | Khinvasara et al. | |
| 2020/0195713 A1* | 6/2020 | Savino | G06F 11/1464 |
| 2020/0319935 A1 | 10/2020 | Srivastava et al. | |
| 2020/0344124 A1* | 10/2020 | Christober | H04L 41/0806 |
| 2021/0263751 A1 | 8/2021 | Wiest et al. | |
| 2022/0012045 A1* | 1/2022 | Rudraraju | G06Q 30/02 |

(Continued)

OTHER PUBLICATIONS

Kafka, "Automatically restarting failed Kafka Connect tasks", Jul. 1, 2019, p. 1-3. (Year: 2019).*

(Continued)

*Primary Examiner* — Kevin L Young
*Assistant Examiner* — Phuong N Hoang
(74) *Attorney, Agent, or Firm* — Schwegman Lundberg & Woessner, P.A.

(57) ABSTRACT

A request to configure a connect cluster including one or more connectors for a cloud computing system is received. The request include a desired connector state. A connector specification file is automatically generated based on the desired connector state for the connect cluster via a declarative application programming interface (API). Application resources associated with the connect cluster are automatically configured based on the specification file.

20 Claims, 8 Drawing Sheets

(56) References Cited

U.S. PATENT DOCUMENTS

| | | | |
|---|---|---|---|
| 2022/0035651 A1 | 2/2022 | Maurya et al. | |
| 2022/0067061 A1 | 3/2022 | Mankad et al. | |
| 2022/0075694 A1* | 3/2022 | Epping | G06F 11/2028 |
| 2022/0086218 A1 | 3/2022 | Sabella et al. | |
| 2022/0159010 A1* | 5/2022 | Bandarupalli | G06F 21/62 |
| 2022/0318208 A1* | 10/2022 | Tripathi | G06F 9/542 |
| 2024/0118940 A1 | 4/2024 | Rc et al. | |

OTHER PUBLICATIONS

Apache, "KIP-745: Connect API to restart connector and tasks", method of restart failed connector on Apache Kafka Connect, Jul. 21, 2021, pp. 1-8. (Year: 2021).*

Confluent, "Manage Kafka Cluster Configuration Settings in Confluent Cloud", pp. 1-5. (Year: 2019).*

"U.S. Appl. No. 18/066,150, Non Final Office Action mailed Mar. 9, 2023".

"U.S. Appl. No. 18/066,150, Response filed Jun. 7, 2023 to Non Final Office Action mailed Mar. 9, 2023", 8 pgs.

"U.S. Appl. No. 18/066,150, Final Office Action mailed Jun. 23, 2023".

"U.S. Appl. No. 18/066,150, Non Final Office Action mailed Oct. 11, 2023", 15 pgs.

"U.S. Appl. No. 18/066,150, Response filed Aug. 29, 2023 to Final Office Action mailed Jun. 23, 2023".

"U.S. Appl. No. 18/066,150, Notice of Allowance mailed Jan. 22, 2024", 8 pgs.

"U.S. Appl. No. 18 066,150, Response filed Dec. 28, 2023 to Non Final Office Action mailed Oct. 11, 2023", 11 pgs.

* cited by examiner

DECLARATIVE API FOR MANAGING CONNECTORS AND SCHEMAS

TECHNICAL FIELD

Examples relate generally to distributed computing environments. More specifically, examples relate to cluster deployment across distributed computing environments.

BACKGROUND

Cloud-computing systems have grown in popularity as a method of providing computer implemented resources. In cloud computing environments, a data center associated with a cloud provider can provide the computer implemented resources, such as data storage, computing resources, software, intelligence, or analytics, at a location remote from a computing device associated with a user. The data center can provide physical or virtual servers, which can provide the data storage, computing resources, software, intelligence, or analytics for access by the user via their computing device. Further examples can include backup and recovery services, social media, multimedia games, chat applications, and the like.

BRIEF DESCRIPTION OF THE DRAWINGS

Various ones of the appended drawings merely illustrate example examples of the present disclosure and should not be considered as limiting its scope.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples described herein involve a declarative API configured to manage connectors and/or schemas on a container management system such as Kubernetes, for example. Managing the connectors and/or schemas declaratively significantly reduces a time that a user spends setting up the connector and/or schema. Using the declarative API described herein allows a user to define a desired state of the connector and/or schema and the declarative API automatically manages the connector and/or schema based on the desired state.

Figure 1:
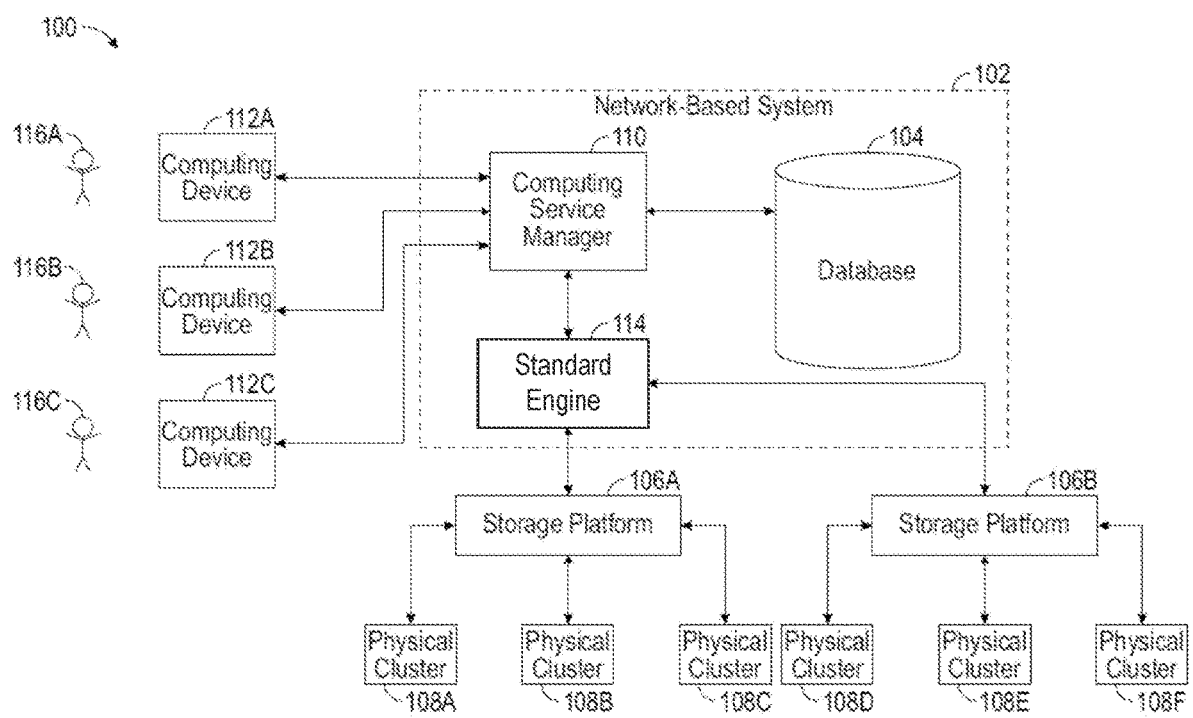
FIG. 1 illustrates a computing environment having a network-based system associated with physical clusters, according to some examples.

Now making reference to FIG. 1, a computing environment 100 is shown in which examples can operate. The environment 100 can include a network-based system 102 that can host and provide data reporting and analysis. The network-based system 102 can include a database 104, which can store data associated with the computing environment 100. The database 104 can store data pertaining to various functions and aspects associated with the network-based system 102. For example, the database 104 can include a summary of data stored in remote data storage systems, such as storage platforms 106A and 106B. Furthermore, the database 104 can include information regarding how data is organized in the storage platforms 106A and 106B and local caches.

In examples, the storage platforms 106A and 106B can be associated with physical clusters 108A-108F and store data associated with the physical clusters 108A-108F. Examples of the storage platforms 106A and 106B that can be used to provide this functionality can include Amazon Web Services™ (AWS™), Microsoft Azure Blob Storage™, Google Cloud Storage™, or the like. The storage platforms 106A and 106B can also include a plurality of computing devices. Furthermore, the storage platforms 106A and 106B can provide various on-demand computer system resources, such as data storage and computing power for devices associated with the computing environment 100. It should be noted that while only two storage platforms, such as the storage platforms 106A and 106B, are shown, any number of storage platforms can be used in accordance with examples.

Figure 2:
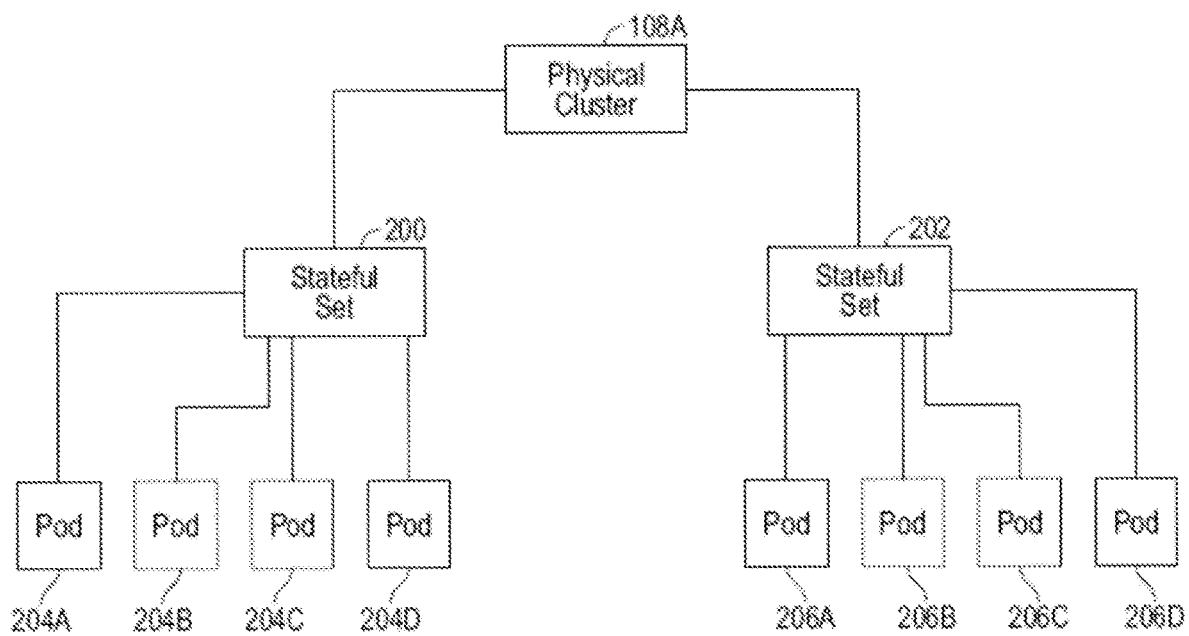
FIG. 2 is an architecture of a physical cluster in the computing environment of FIG. 1, according to some examples.

The network-based system 102 can also be used for the analysis and the reporting of data gleaned from disparate entities, such as the physical clusters 108A-108F. Now making reference to FIG. 2, an example of an architecture associated with the physical cluster 108A is illustrated. It should be noted that while an architecture is shown for the physical cluster 108A, the same description is applicable to each of the physical clusters 108B-108F such that each of the physical clusters 108B-108F can have an architecture similar to that described with reference to FIG. 2. In examples, the physical cluster 108A can be a Kubernetes cluster that utilizes a container orchestration platform to manage applications that are distributed and containerized. Kubernetes is a container management system that allows for the deployment of web applications, batch jobs, and databases via a unified API As shown with reference to FIG. 2, the physical cluster 108A can include stateful sets 200 and 202. In an example, the stateful set 200 can be associated with pods 204A-204D and the stateful set 202 can be associated with pods 206A-206D. The stateful sets 200 and 202 can manage and maintain the respective pods 204A-204D and 206A-206D. The pods 204A-204D and 206A-206D can be a group of one or more containers that can share storage resources along with network resources. Each of the pods 204A-204D and 206A-206D can include several components. To further illustrate, each of the pods 204A-204D and 206A-206D can include an ordinal, stable storage, and a stable network identity. Moreover, each of the pods 204A-204D and 206A-206D can represent an application instance that can run an application within the physical cluster 108A. Examples of an application instance that each of the pods 204A-204D and 206A-206D can run can include Apache Kafka™, Kafka™ structured query language (KSQL), SchemaRegistry, Connect, or the like. In examples, each of the pods 204A-204D and 206A-206D can have their own lifecycle and one of the following states: SETUP, RUN, DISABLED, or DELETED. Moreover, when all the pods 204A-204D are in a RUN state, the stateful set 200 is fully available. Similarly, when all the pods 206A-206D are in a RUN state, the stateful set 202 is fully available.

Each of the stateful sets 200 and 202 can add labels to each of the pods 204A-204D and 206A-206D associated with the stateful sets 200 and 202. In examples, the labels can enable a user associated with the stateful sets 200 and 202 to attach a service to each of the pods 204A-204D and 206A-206D. In examples, each of the stateful sets 200 and 202 can include an ordinal index that assigns the ordinals assigned to the pods 204A-204D and 206A-206D. Furthermore, the stateful sets 200 and 202 can include hostnames, headless services, a domain, and a DNS subdomain associated with the stable network identities of the pods 204A-204D and 206A-206D.

As described above, the techniques described herein can be used in conjunction with, for example, a Kafka or other type of distributed computing environment that, for example, provides distributed streaming or messaging and maintains feeds of messages in topics which are partitioned and replicated across multiple nodes and/or brokers of a cluster.

For example, in a Kafka environment, a Kafka operator can be used to create, configure, and manage instances of Kafka applications operating within a Kafka cluster, by extending the underlying Kafka application program interface (API) that enables the creation, configuration and management of deployed applications, and depending on a current workload and in accordance with user-configured alerts, reassigning a selection of existing co-located partitions to new nodes and/or brokers, such that computational load of the Kafka environment is more evenly distributed across the Kafka cluster.

Although many of the features and techniques described herein are illustrated using the example of a Kafka environment, the features and techniques can be similarly used with other types of distributed computing environments.

Returning attention to FIG. 1 and the computing environment 100, the network-based system 102 can include a computing service manager 110, which can coordinate and manage operations of the network-based system 102. In addition, the computing service manager 110 can manage computing services that provide computing resources for the network-based system 102. Moreover, the computing service manager 110 can be in communication with computing devices 112A-112C. As mentioned above, the pods 204A-204D and 206A-206D can run an application, such as Apache Kafka™, KSQL, SchemaRegistry, Connect, or the like.

According to examples, a plurality of clusters is managed over a plurality of different private cloud environments based on a set of standards. For example, a single API may be used to manage clusters created across multiple network-based systems 102. For example, the API may include a declarative API. The set of standards may include standards created by a user, for example. In some cases, the standards are a set of default standards that a user can adapt for a specific application. In some examples, a single API may be used to create the multiple clusters according to the set of standards. Subsequent cluster deployments may be configured to inherit a previous set of standards. The API may prompt a user to provide one or more inputs to create a set of standards for the plurality of clusters.

In examples, the network-based system 102 can include a standard engine 114 that can implement a set of standards provided by the users 116A-116C across an entire fleet of clusters associated with one or more network-based systems 102 and managed by the users 116A-116C, such as the physical clusters 108A-108F and the pods 204A-204D and 206A-206D. Throughout this document, reference will be made to the term "entire fleet." It should be noted that a reference to the term "entire fleet" can mean an entire fleet of clusters associated with the network-based system 102 and managed by the users 116A-116C, such as the physical clusters 108A-108F and the pods 204A-204D and 206A-206D. The standard engine 114 can be configured to provide multiple computing resources that execute various data storage and retrieval tasks. As shown with reference to FIG. 1, the standard engine 114 can be coupled with the storage platforms 106A and 106B. It should be noted while the standard engine 114 is shown being coupled to two storage platforms, the standard engine 114 can be coupled to any number of storage platforms having the functionality of the storage platforms 106A and 106B discussed above.

According to some examples, one or more users 116A-116C may request to deploy clusters according to a set of standards. The cluster deployment may be accomplished using a user interface. The user interface may prompt the user 116-116C to provide information to form the set of standards that will be applied to at least a portion of the clusters in the fleet. In some cases, the set of standards may be applied to all clusters in the fleet across multiple private cloud environments. The user interface may allow the user to update a set of standards from a previous cluster deployment. The user interface can be presented on one of the devices 112A-112C associated with one of the users 116A-116C requesting that an update be performed. The set of standards may include one or more of component.

Figure 3:
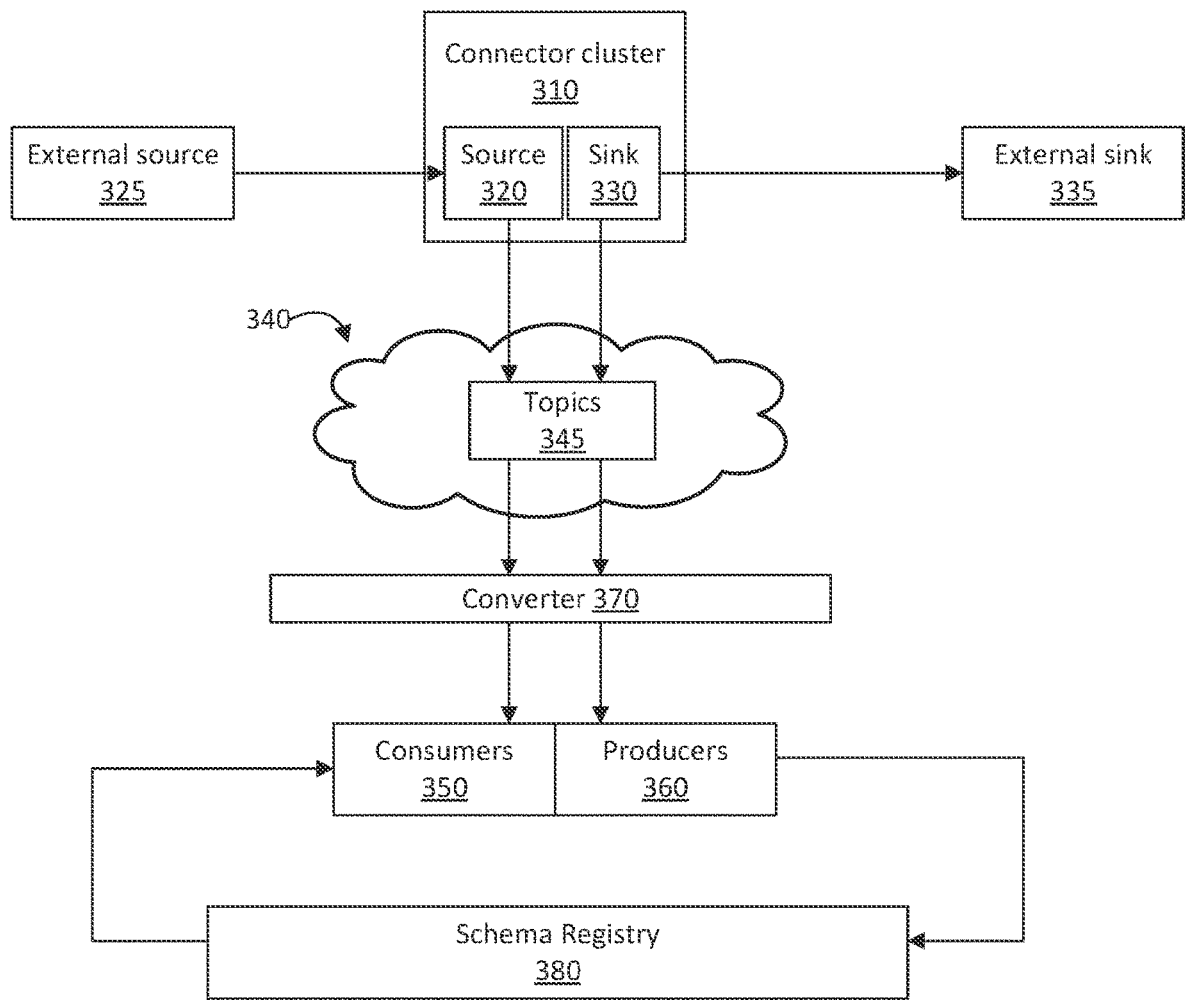
FIG. 3 shows a data pipeline for managing clusters in accordance with an example.

FIG. 3 shows a data pipeline for managing clusters in accordance with an example. There are three main components to the system shown in FIG. 3, each with a different role: connectors, tasks, workers, and schemas.

Connectors are responsible for the number of tasks, splitting work between tasks, getting configurations for the tasks from the workers, and passing it to the tasks, for example. According to some examples, there are two types of connectors: source connectors 320 and sink connectors 330 in a connector cluster 310. Connectors are responsible for some of the task management, but may not be responsible for the actual data movement.

Similarly, there may be two different types of corresponding tasks: source tasks and sink tasks. A source task may contain custom code to get data from the source system 325 to Kafka topics 345 within a Kafka cluster 340 via a consumer 350, for example. A sink task uses a Kafka producer 360 to access Kafka topics 345 and read data, and custom code to push data to the sink system 335, for example. Tasks are responsible for getting data into and out of Kafka. According to some examples, tasks are only responsible for getting data into and out of Kafka on the source or sink side and the workers manage data flow to/from Kafka topics). Once started, source tasks may poll source systems and retrieve the data that the workers send to Kafka topics and sink tasks get records from Kafka via the worker, and write the records to the sink system 335.

Workers are the processes that execute the connectors and tasks. They handle various requests that define connectors and configurations, start the connectors and tasks, and pass configurations to the connectors. If using distributed workers, and a worker process dies, then the connectors and tasks associated with the failed worked will be taken over and load balanced among the remaining workers. In an example, a Kafka connect cluster has one (standalone) or more (distributed) workers running on one or more servers. The workers manage connectors and tasks, distributing work among the available worker processes. A connector plugin is a collection of connectors and tasks deployed to each worker.

A converter 370 may be used to handle the serialization and/or deserialization of data. An optional transformer disposed between connectors and converters may provide transformation functionality and can perform one or more transformations to data passing through. For example, the transformers may be configure to perform actions such as dropping fields, changing field types, and/or adding metadata, for example.

A schema registry 380 is coupled to the consumers 350 and producers 360. The schema registry 380 registers and manages one or more schemas. Each schema describes the data being exchanged. For example, each schema defines a structure of the data format by way of metadata, for example.

A common Kafka connect use case is orchestrating real-time streams of events from a data source to a target for analytics. By having Kafka sit between the systems, the system is loosely coupled. This means that a user can easily switch out the source or target, or stream to multiple targets, for example. In the event that the system gets overwhelmed, Kafka can act as a buffer.

Examples described herein involve a declarative API configured to manage connectors and/or schemas on a container management system such as Kubernetes, for example. Managing the connectors and/or schemas declaratively significantly reduces a time that a user spends setting up the connector and/or schema. Using the declarative API described herein allows a user to define a desired state of the connector and/or schema and the declarative API automatically manages the connector and/or schema based on the desired state.

Figure 4:
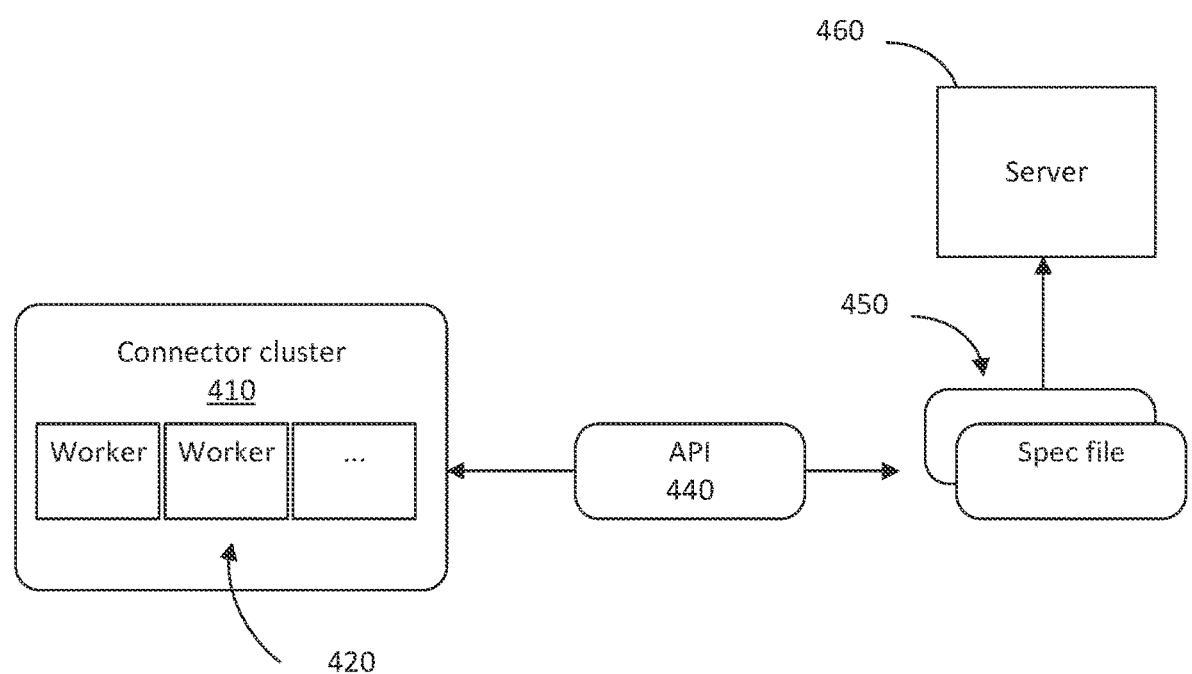
FIG. 4 shows a connector management system utilizing a Kubernetes system in accordance with some examples.

FIG. 4 shows a connector management system utilizing a Kubernetes system in accordance with some examples. A connector cluster 410 has one or more workers 420. In some examples, the connector cluster has at least two workers. The connector cluster 410 is coupled to a declarative API 440 that is configured to manage the connectors in the distributed computing system. The declarative API 440 may be configured to receive a desired connector state from a user and configure the connectors based on the desired state. In order to do this, the declarative API 440 may create one or more configuration files 450 for the connectors. For example, the declarative API 440 may generate one or more YAML files that define class names and one or more configurations of the connector. In some cases, the declarative API may be configured to perform provisioning, configuring, updating, deleting, managing, and/or observing the current state of the connector easily through interactions with the connector configuration file 450.

The configuration files 450 may then be submitted to the API server 460 and the connector controller of the declarative API 440 may determine whether the connector achieves the desired state. With any updates on the configuration file, the declarative API 440 gets notified and automates the operations to accommodate the updates.

As described above connectors run on workers. To have the latest status of workers reflected on connector, the API may check the connector status periodically. For example, the API may check the connector status and/or tasks every few minutes and provision workers accordingly.

Some examples, provide for managing the lifecycle of connectors. For example, if a connector is in a failed state, the API may have an auto-healing function. The auto-healing process may involve a number of steps that increase the level of intervention if a preceding step does not work. First the API may attempt to automatically restart the connector. The restart attempt may continue until the connector is no longer in a failed state. In some examples, the API attempts to restart the connector a specified number of times until it reaches a specified maximum retry value. A user may be able to configure the API to automatically attempt to restart the task in the event of a failure. The user may be able to specify the number of retries available. In some examples, a user may be able to trigger a restart, pause, and/or resume operation on the connector or task at a specified time.

According to some examples, the system described herein may be configured to mount one or more secrets into connector pods. A secret is an object containing sensitive data, for example. It can be used as files in a pod. When the secret name is specified in the connect connector configuration file 450, the data of the secret is injected into the pods and can be used by connectors. The secrets may include one or more of usernames, passwords, tokens, and keys, for example. According to some examples, some connectors may use specific certificates to communicate with the external data systems for security. The certificates can be mounted into pods automatically based on the desired state.

Each connector may be associated with a connector plugin. Connector plugins may be configured to translate between external systems and the Kafka connect framework. Connector plugins may define how source connectors should collect data from a source system and/or how sink connectors should prepare Kafka data so it is recognized by target systems. Manually configuring connectors may take a considerable amount of time for a user.

Figure 5:
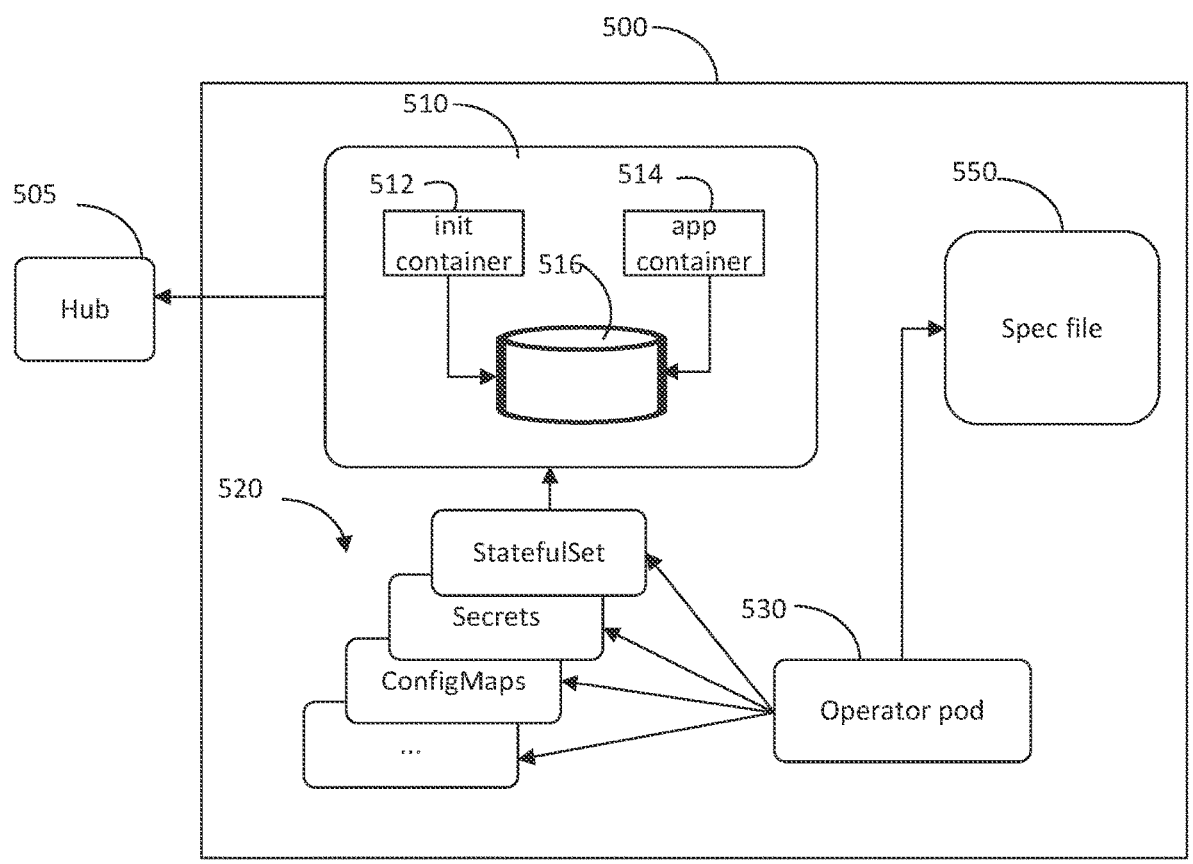
FIG. 5 illustrates an example of a declarative API system 500 for automatically configuring connectors in accordance with various examples.

Examples described herein allow for the automatic creation of connector plugins based on a desired state specified by a user via the declarative API. FIG. 5 illustrates an example of a declarative API system 500 for automatically configuring connectors in accordance with various examples. The declarative API may use init container 512 in a connect pod 510 to download and install connector plugins. Init container 512 is a specialized container that runs before other application containers 514 in the pod 510. According to an example, init container 512 can contain setup scripts which are not present in an application image. This process can complete the plugins installation before starting the Kafka Connect server.

The declarative API system 500 of FIG. 5 may allow to specify the installation information in the configuration file 550. After the configuration file 550 is submitted successfully to the API server, the declarative API system 500 monitors the connector and creates resources 520 such as StatefulSet, ConfigMaps, and secrets, for example via an operator pod 530. When the connect pod 510 starts, the init container 512 runs first and automatically downloads any requested connector plugins, stores them in node volume 516, and installs them.

Below is an example of a declarative connector specification to install connector plugins from a hub 505.

```
kind: Connect
metadata:
    name: connect
spec:
    replicas: 2
    image:
        application: confluentinc/cp-server-connect:7.0.1
        init: confluentinc/confluent-init-container:2.2.0-1
    build:
        types: onDemand
        onDemand:
            plugins:
                locationType: confluentHub
                confluentHub:
                    - name: kafka-connect-s3-source
                      owner: confluentinc
                      version: 2.0.1
            storageLimit: 4G
```

In this example, the build type OnDemand indicates the requested connector plugins will be installed by the declarative API. The locationType confluentHub indicates the list of plugins it is getting from the hub. StorageLimit is used to define a maximum amount of volume for storing plugins. Several different types of volume may be specified. For example, the system may use persistent volume and/or ephemeral volume.

Figure 6:
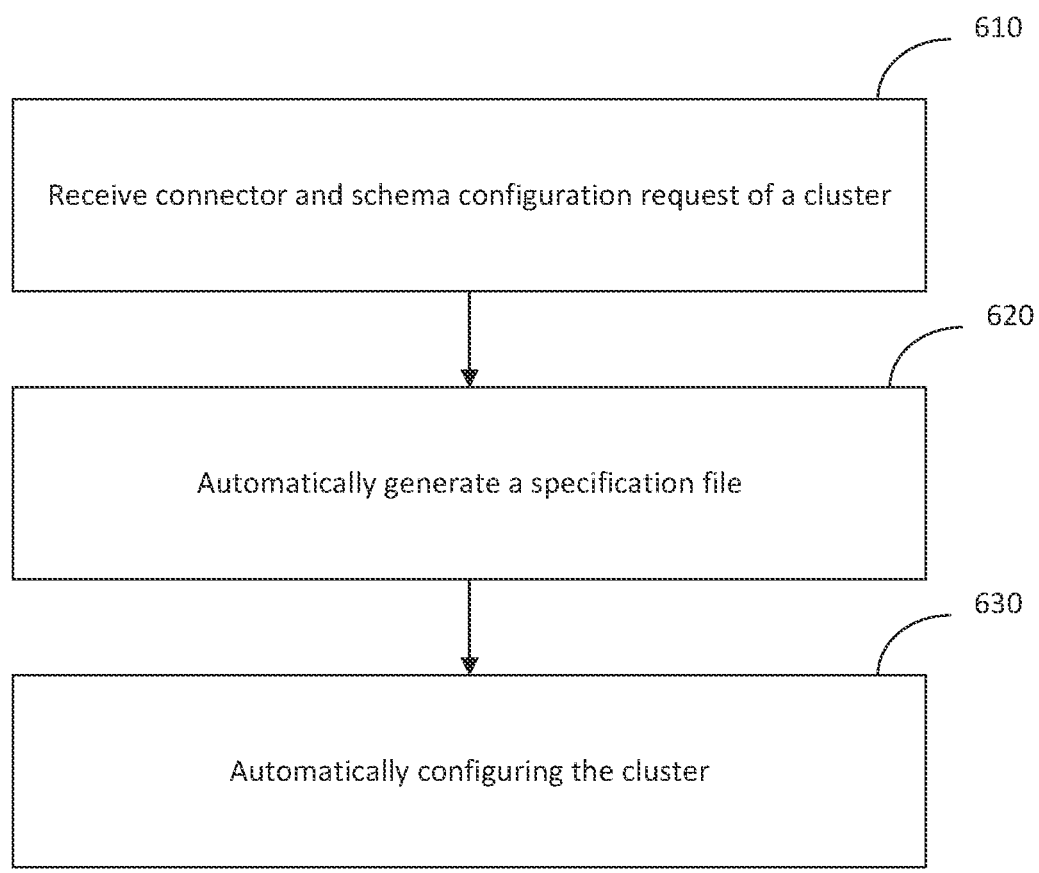
FIG. 6 shows a method for using a declarative API for managing connectors and schemas according to some examples.

FIG. 6 illustrates a process for automatically configuring one or more connectors and/or schemas in accordance with various examples. A request to configure a connect cluster comprising one or more connectors and schema for a cloud computing system is received 610. The request includes a desired schema and/or connector state. A connector specification file is automatically generated 620 based on the desired connector state for the connect cluster via a declarative application programming interface (API). Application resources associated with the connect cluster and schema are automatically configured 630 based on the specification file.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 4 and 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices. In examples, communication links between elements of the computing environment 100 are implemented via one or more data communication networks. These data communication networks may utilize any wired or wireless communication protocol and any type of communication medium. In some embodiments, the data communication networks are a combination of two or more data communication networks (or sub-networks) coupled to one another.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-6 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 7:
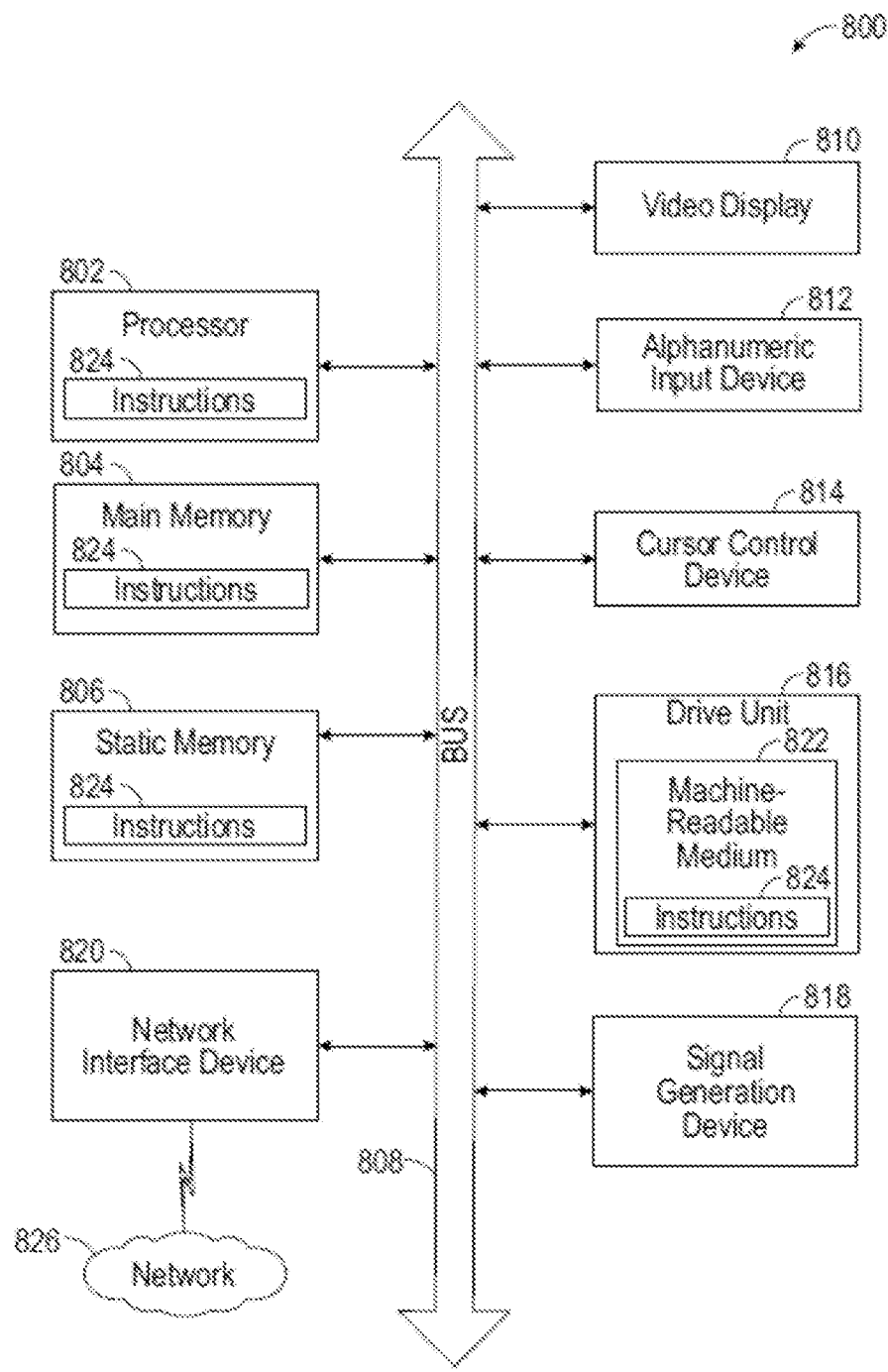
FIG. 7 is a block diagram illustrating architecture of software used for some examples.

FIG. 7 is a block diagram 700 illustrating a software architecture 702, which may be installed on any one or more of the devices described above. FIG. 4 is merely a non-limiting example of a software architecture, and it will be appreciated that many other architectures may be implemented to facilitate the functionality described herein. The software architecture 702 may be implemented by hardware such as a machine 800 of FIG. 8 that includes a processor 802, memory 804 and 806, and I/O components 810-814. In this example, the software architecture 702 may be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, according to some implementations.

In various implementations, the operating system 704 manages hardware resources and provides common services. The operating system 704 includes, for example, a kernel 720, services 722, and drivers 724. The kernel 720 acts as an abstraction layer between the hardware and the other software layers in some implementations. For example, the kernel 720 provides memory management, processor management (e.g., scheduling), component management, networking, and security settings, among other functionalities. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 706 provide a low-level common infrastructure that may be utilized by the applications 710. The libraries 706 may include system libraries 730 (e.g., C standard library) that may provide functions such as memory allocation functions, string manipulation functions, mathematic functions, and the like. In addition, the libraries 706 may include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 may also include a wide variety of other libraries 734 to provide many other APIs to the applications 710.

The frameworks 708 provide a high-level common infrastructure that may be utilized by the applications 710, according to some implementations. For example, the frameworks 708 provide various graphic user interface (GUI) functions, high-level resource management, high-level location services, and so forth. The frameworks 708 may provide a broad spectrum of other APIs that may be utilized by the applications 710, some of which may be specific to a particular operating system or platform.

In an example, the applications 710 include a home application 750, a contacts application 752, a browser application 754, a book reader application 756, a location application 758, a media application 760, a messaging application 762, a game application 764, and a broad assortment of other applications such as a third-party application 766. According to some examples, the applications 710 are programs that execute functions defined in the programs. Various programming languages may be employed to create one or more of the applications 710, structured in a variety of manners, such as object-orientated programming languages (e.g., Objective-C, Java, or C++) or procedural programming languages (e.g., C or assembly language). In a specific example, the third-party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 766 may invoke the API calls 712 provided by the mobile operating system (e.g., the operating system 704) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 108 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 8:
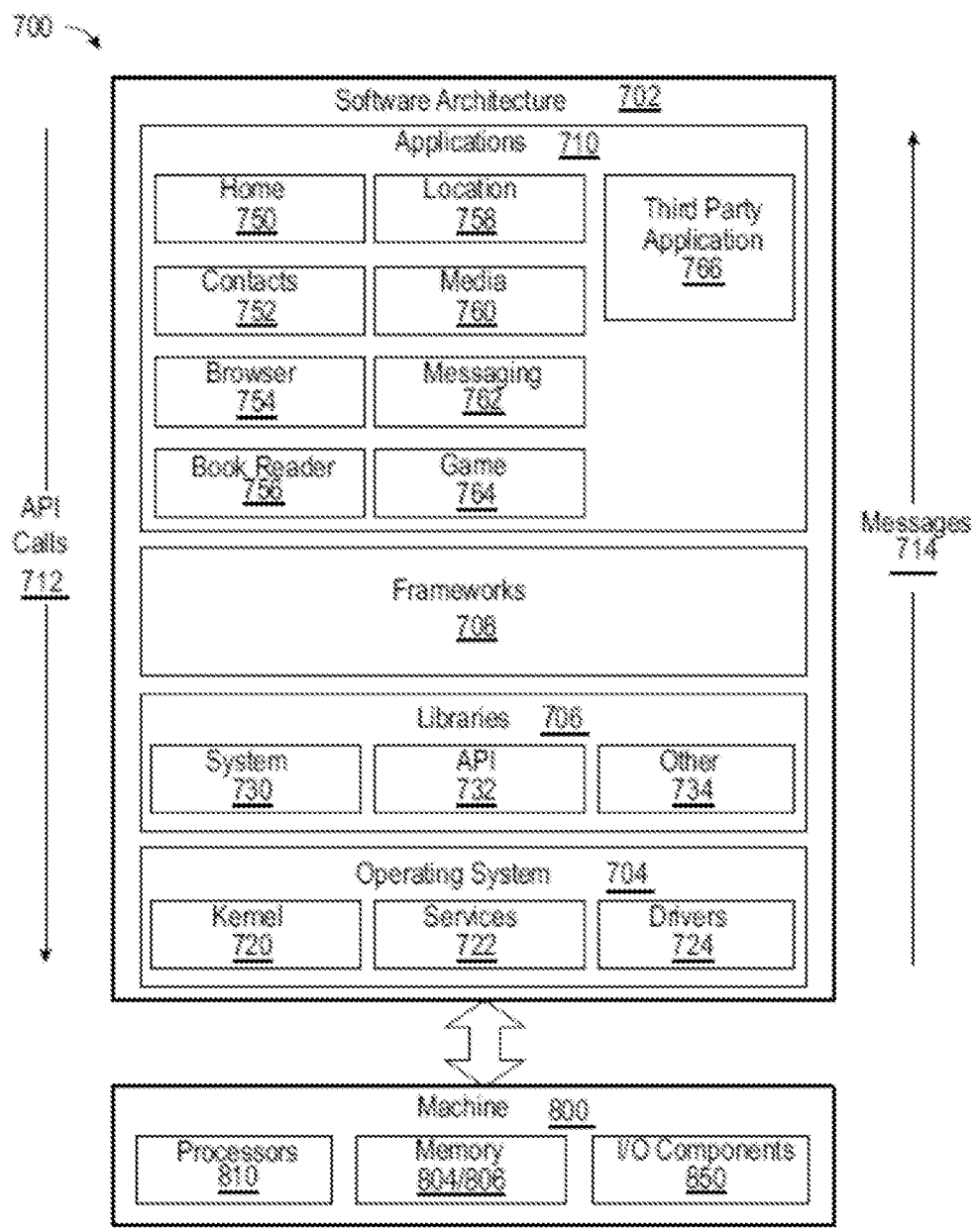
FIG. 8 shows a machine as an example computer system with for cluster deployment according to some examples.

FIG. 8 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The machine 800, which can be a computer system, includes the processor 802 (e.g., a central processing unit (CPU), a graphics processing unit (GPU) or both), a main memory 804 and a static memory 806, which communicate with each other via a bus 808. The machine 800 may further include a video display unit 810 (e.g., a liquid crystal display (LCD) or a cathode ray tube (CRT)). The machine 800 also includes an alphanumeric input device 812 (e.g., a keyboard), a user interface (UI) navigation device (cursor control device) 814 (e.g., a mouse), a disk drive unit 816, a signal generation device 818 (e.g., a speaker) and a network interface device 820.

The drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the machine 800, the main memory 804 and the processor 802 also constituting machine-readable media. Instructions 824 may also reside within the static memory 806.

While the machine-readable medium 822 is shown in an example to be a single medium, the term "machine-readable medium" may include a single medium or multiple media (e.g., a centralized or distributed database, and/or associated caches and servers) that store the one or more instructions or data instructions 824. The term "machine-readable medium" shall also be taken to include any tangible medium that is capable of storing, encoding or carrying instructions 824 for execution by the machine and that cause the machine to perform any one or more of the methodologies of the present invention, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and WiMax networks). The term "transmission medium" shall be taken to include any intangible medium that is capable of storing, encoding or carrying instructions 824 for execution by the machine, and includes digital or analog communications signals or other intangible media to facilitate communication of such software.

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim.

Rather, as the following claims reflect, inventive subject matter lies in less than all features of a single disclosed example. Thus, the following claims are hereby incorporated into the Detailed Description, with each claim standing on its own as a separate example.

The various memories and/or storage unit may store one or more sets of instructions and data structures (e.g., software) embodying or utilized by any one or more of the methodologies or functions described herein. These instructions, when executed by processor(s), cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of network, such as the network-based system 102 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. To further illustrate, a network or a portion of a network may include a wireless or cellular network, where a coupling may be a Code Division Multiple Access (CDMA) connection, a Global System for Mobile communications (GSM) connection, or another type of cellular or wireless coupling. In this illustration, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over a network using a transmission medium via a network interface device and utilizing any one of a number of well-known transfer protocols (e.g., hypertext transfer protocol (HTTP)). Similarly, the instructions may be transmitted or received using a transmission medium via the coupling (e.g., a peer-to-peer coupling) to devices. The terms "transmission medium" and "signal medium" mean the same thing and may be used interchangeably in this disclosure. The terms "transmission medium" and "signal medium" shall be taken to include any intangible medium that is capable of storing, encoding, or carrying instructions for execution by a machine, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method comprising:
receiving, at a declarative application programming interface (API), a request to configure a connect cluster comprising one or more connectors for a cloud computing system, the request including a particular state and a schema defined by a user for the connect cluster;
in response to receiving the request, automatically generating a connector specification file based on the particular state and schema defined by the user that triggers installation of one or more connector plugins, the connector specification file including a list of the one or more connector plugins;
automatically configuring application resources associated with the connect cluster based on the connector specification file, the automatically configuring including causing download and installation of the one or more connector plugins;
detecting a connector in the connect cluster being in a failed state; and
in response to detecting the connector being in the failed state, attempting to restart the connector via the declarative API.

2. The method of claim 1, wherein automatically configuring the application resources comprises automatically assigning one or more tasks based on the particular state of the connect cluster specified by the request.

3. The method of claim 1, wherein attempting to restart the connector is based on user input to configure the declarative API to automatically perform a restart attempt.

4. The method of claim 1, further comprising:
determining the connector remains in the failed state; and
in response to the determining that the connector remains in the failed state, repeatedly attempting to restart the connector until a specified number of restart attempts have been attempted.

5. The method of claim 1, wherein each connector of the one or more connectors comprises:
a connector plugin configured to implement one or more classes and one or more abstractions of the connector, and
a connector instance configured to manage replication of data between two or more data systems within the cloud computing system.

6. The method of claim 1, wherein the connector specification file further comprises an indication of a maximum amount of volume for storing the one or more connector plugins.

7. The method of claim 1, wherein the connect cluster comprises a plurality of stateful sets, each stateful set of the plurality of stateful sets having a plurality of pods associated therewith.

8. The method of claim 7, wherein the one or more connector plugins are downloaded and installed by an init container in a pod of the plurality of pods, the init container downloading the one or more connector plugins, storing the one or more connector plugins in a node volume, and installing the one or more connector plugins before an application container in the pod runs.

9. The method of claim 7, wherein:
the connector specification file further includes a secret name; and
the automatically configuring the application resources further comprises injecting data of a secret associated with the secret name into a pod of the plurality of pods.

10. The method of claim 9, wherein the secret comprises one or more of a username, a password, a token, or a key.

11. The method of claim 7, further comprising mounting a certificate in a pod of the plurality of pods based on the particular state, the certificate used by a corresponding connector to securely communicate with an external data system.

12. The method of claim 1, wherein attempting to restart the connector is performed in response to user input indicative of a specified time to trigger a restart attempt.

13. A system, comprising:
at least one processor; and
memory storing instructions that, when executed by the at least one processor cause the system to perform operations comprising:
receiving, at a declarative application programming interface (API), a request to configure a connect cluster comprising one or more connectors for a cloud computing system, the request including a particular state and a schema defined by a user for the connect cluster;
in response to receiving the request, automatically generating a connector specification file based on the particular state and schema defined by the user that triggers installation of one or more connector plugins, the connector specification file including a list of the one or more connector plugins;
automatically configuring application resources associated with the connect cluster based on the connector specification file, the automatically configuring including causing download and installation of the one or more connector plugins;
detecting a connector in the connect cluster being in a failed state; and
in response to detecting the connector being in the failed state, attempting to restart the connector via the declarative API.

14. The system of claim 13, wherein automatically configuring the application resources comprises automatically assigning one or more tasks based on the particular state of the connect cluster specified by the request.

15. The system of claim 13, wherein attempting to restart the connector is based on user input to configure the declarative API to automatically perform a restart attempt.

16. The system of claim 13, wherein the operations further comprise:
determining the connector remains in the failed state; and
in response to the determining that the connector remains in the failed state, attempting to restart the connector until a specified number of restart attempts have been attempted.

17. The system of claim 13, wherein each connector of the one or more connectors comprises:
a connector plugin configured to implement one or more classes and one or more abstractions of the connector, and
a connector instance configured to manage replication of data between two or more data systems within the cloud computing system.

18. The system of claim 13, wherein the connect cluster comprises a plurality of stateful sets, each stateful set of the plurality of stateful sets having a plurality of pods associated therewith.

19. The system of claim 13, wherein attempting to restart the connector is performed in response to user input indicative of a specified time to trigger a restart attempt.

20. A non-transitory machine-readable medium having instructions embodied thereon, the instructions executable by a processor of a machine to perform operations comprising:
receiving, at a declarative application programming interface (API), a request to configure a connect cluster comprising one or more connectors for a cloud computing system, the request including a particular state and a schema defined by a user for the connect cluster;
in response to receiving the request, automatically generating a connector specification file based on the particular state and schema defined by the user that triggers installation of one or more connector plugins, the connector specification file including a list of the one or more connector plugins;
automatically configuring application resources associated with the connect cluster based on the specification file, the automatically configuring including causing download and installation of the one or more connector plugins;
detecting a connector in the connect cluster being in a failed state; and
in response to detecting the connector being in the failed state, attempting to restart the connector via the declarative API.

* * * * *